United States Patent
Miller et al.

(10) Patent No.: US 10,110,675 B1
(45) Date of Patent: Oct. 23, 2018

(54) PRESENTATION OF DIRECTED CONTENT AT SEMI-CONNECTED DEVICES

(71) Applicant: Amazon Technologies, Inc., Seattle, WA (US)

(72) Inventors: John Martin Miller, Seattle, WA (US); Amit Vasant Kulkarni, Bellevue, WA (US); Michael John Liddell, Seattle, WA (US); Michael Lee Loritsch, Seattle, WA (US); Eli Harlan Pinkerton, Seattle, WA (US); Sapan Purohit, Lake Forest Park, WA (US); Timothy Bradford Shoaf, Seattle, WA (US); Shawn Paul Smith, Seattle, WA (US); Runhe Tian, Seattle, WA (US); Ross Tucker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 198 days.

(21) Appl. No.: 15/072,216

(22) Filed: Mar. 16, 2016

(51) Int. Cl.
*G06F 15/16* (2006.01)
*H04L 29/08* (2006.01)

(52) U.S. Cl.
CPC .............. *H04L 67/1095* (2013.01)

(58) Field of Classification Search
CPC ................................ H04L 67/1095
USPC ............... 709/202–205, 217–219, 227–228; 707/770
See application file for complete search history.

(56) References Cited

U.S. PATENT DOCUMENTS

| | | | | |
|---|---|---|---|---|
| 5,442,390 A * | 8/1995 | Hooper | .............. | H04N 7/17318 348/E7.071 |
| 7,827,162 B2 * | 11/2010 | Suitts | .................. | H04N 7/17336 707/695 |
| 8,964,710 B2 * | 2/2015 | Sivertsen | ............ | H04W 84/005 370/338 |
| 9,355,682 B2 * | 5/2016 | Sung | ........................ | H04L 67/02 |
| 9,848,241 B2 * | 12/2017 | Zilberstein | ........... | H04N 21/458 |
| 2009/0083288 A1 * | 3/2009 | LeDain | .................... | G09B 5/06 715/742 |
| 2015/0052102 A1 * | 2/2015 | Nihal | ..................... | H04N 21/00 707/610 |

* cited by examiner

*Primary Examiner* — Bharat N Barot
(74) *Attorney, Agent, or Firm* — Eversheds Sutherland (US) LLP

(57) ABSTRACT

Delivery of directed content to semi-connected devices is provided. In some embodiments, content packages configured to be presented at a semi-connected device can be partitioned into alternative content packages. The alternative content packages are seamless to a publisher of the content packages and that permits backward compatibility with existing technology. Configuration of presentation attributes of the alternative content packages can be accomplished via rules that contemplate several delivery factors, such as publisher of the content package; type of the content package; type of the semi-connected device; and/or a model of such a device. Application of such rules for a content package can result in customized metadata that controls presentation of a media asset associated with the content package.

20 Claims, 12 Drawing Sheets

PRESENTATION OF DIRECTED CONTENT AT SEMI-CONNECTED DEVICES

BACKGROUND

Asynchronous delivery of content to semi-connected devices generally results in the content being retained at the device. In addition to the content, information that permits controlling the presentation of the content also is sent to the device. Such information typically conveys a period for which the content may be presented at the device. Repetitive presentation of the content during an extended period can result in diminished interaction of an end-user with the content. In addition, lack of updated content during extended periods can result in limited reach of the content to various devices.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least certain embodiments, the issue of presentation of directed content in semi-connected devices for an extended period. Directed content can be embodied in or can include any type of digital media, such as advertisement; music; still images; motion pictures, animations, or other types of video segments; video games; podcasts; and the like. Such a type of presentation of directed content in semi-connected devices typically suffers from diminishing interaction by an end-user with the content as the presentation progresses. In addition, seldom updating the directed content can result in limited reach of the content to various devices and/or lack of flexibility in the distribution of the directed content among semi-connected devices. The disclosure provides embodiments of systems, devices, and techniques for delivering directed content to semi-connected devices in a manner that lessens the issues related to presentation of content during extended periods, providing improved reach and pacing flexibility for directed content. At least some embodiments of this disclosure also can improve computational efficiency of common systems for delivery of directed content to semi-connected devices. In some aspects, those embodiments can address common issues of conventional delivery systems, such as the lack of selective removal of directed content from a semi-connected device. In addition or in other aspects, those embodiments can address other issues associated with at least some semi-connected devices, such as the lack of capability to receive instructions for removal of directed content within one such semi-connected device. In some embodiments, content packages configured to be presented at a semi-connected device for an extended period can be partitioned into alternative content packages, referred to as "flight packages," in a manner that is seamless to a publisher of the content and that permits backward compatibility with existing technology. Configuration of presentation attributes of flight packages can be accomplished via rules that contemplate several delivery factors, such as publisher of the content package; type of the content package; type of the semi-connected device; and/or a model of such a device. Application of such rules for a content package can result in customized metadata that controls presentation of a media asset associated with the content package. Such customized presentation can increase the reach of the content conveyed by the media asset and it can afford pacing flexibility while preserving an original configuration of the content as put forth by a publisher of the content. Flight packages also permit various assessments of performance of media assets (e.g., AB testing or other types of comparative testing), and can provide other types of feedback associated with originally published content.

Figure 1:
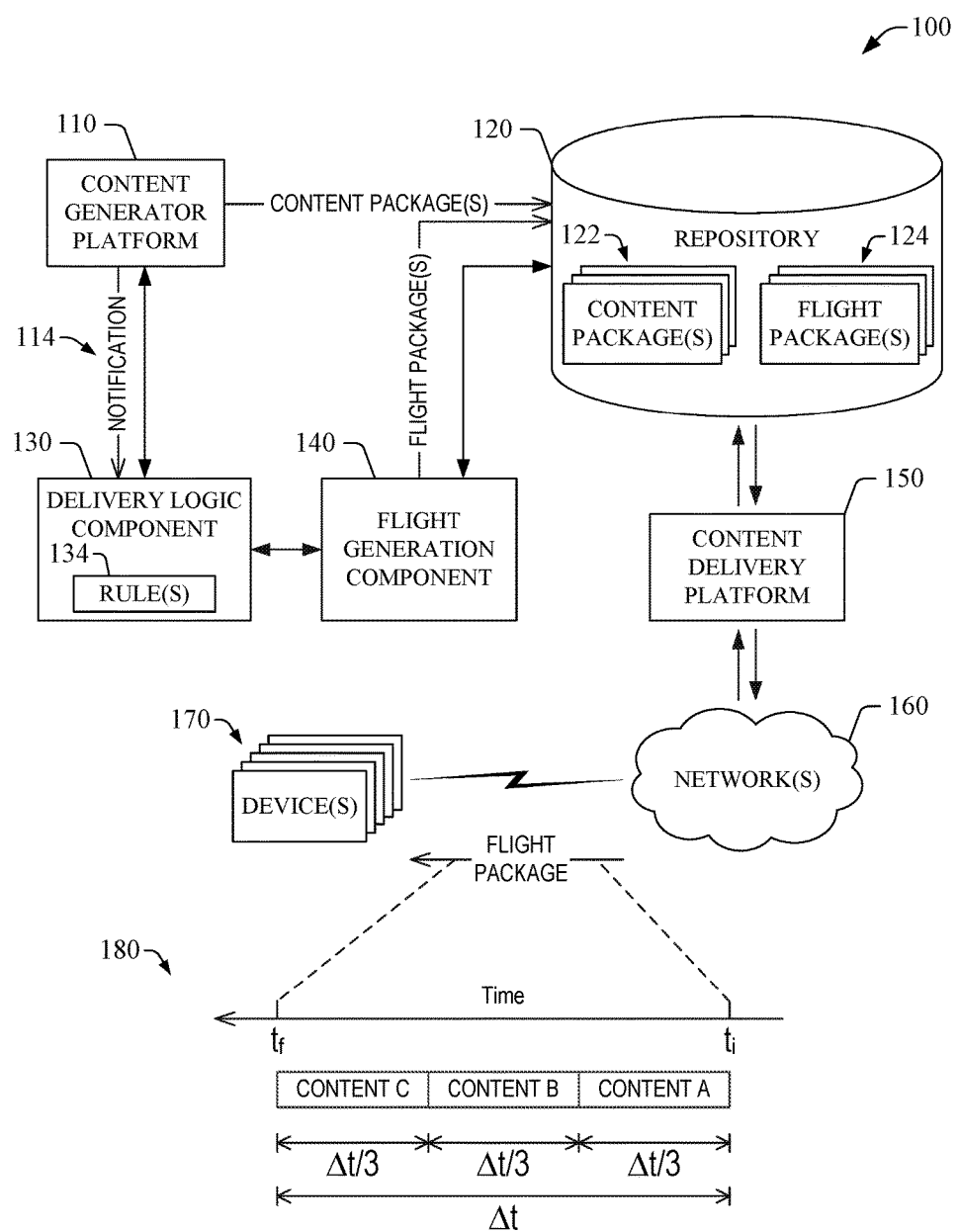
FIG. 1 presents an example of an operational environment for delivery of directed content in accordance with one or more aspects of the disclosure.

Referring to the drawings, FIG. 1 illustrates an example of an operational environment 100 in accordance with one or more embodiments of the disclosure. The operational environment 100 can include a content generator platform 110 that can generate content packages. A content package can include, for example, a media asset and metadata associated with media asset. In certain implementations, a media asset can include digital content (digital image(s), digital audio, combinations thereof, etc.) that can be consumed by a user device (e.g., a personal computer, a mobile device, such as electronic book reader device (also referred to as an e-book reader or e-reader) smartphone or a tablet computer, or the like). The metadata can regulate aspects of presentation of the media asset at a user device. In addition or in other implementations, the metadata can include information metadata indicative or otherwise representative of the content associated with a respective media asset. For instance, the metadata can include an asset identifier, such as internet movie database (IMDb) identifier, a title, a cast, or the like. The content generator platform 110 can include one or more devices that permit or otherwise facilitate the generation and/or publication of content packages. Accordingly, the content packages can be referred to as being produced by a publisher, such as an advertiser, a movie studio, a television studio, or a smaller production company. In some instances, one or more content packages can include user-generated content. In some aspects, the publication of a content package can refer to the presentation and/or transmission of information indicative of availability of the content package to a device associated with a distribution platform that can deliver the content package. The distribution platform can include, in one example, devices associated with (e.g., owned, leased, or otherwise administered) an entity that administers the content generator platform 110. In another example, the distribution platform can be a third-party to the content generator platform 110. More specifically, in one example scenario, the content generator platform 110 can include devices associated with an advertiser and the third-party can include a distributor of content packages generated by the advertiser via the content generator platform 110. In some embodiments, the distributor can rely on one or more channels for the distribution of content from the advertiser. The channels can include, for example, printed media, radio and/or television, web-based media, and the like. In addition or in other embodiments, the distributor can provide content packages to semi-connected devices. In some embodiments, a semi-connected device can be embodied in or can include a device that only at some times the user device is connected to a communication network. The communication network includes devices that permit or otherwise facilitate transmission of information (e.g., data, metadata, and/or signaling) from the semi-connected device to a remote device and/or reception of information from the remote device.

As illustrated, the content generator platform 110 can send a content package to a repository 120, which can be embodied in or can include one or more memory devices. As mentioned, the content package can include a media asset and metadata that can control presentation of the media asset at a device. Content packages can be retained in one or more memory elements 122 (collectively referred to as content package(s) 122). In some embodiments, in response to generation of a content package—e.g., upon or after the generation of the content package—the content generator platform 110 can send a notification 114 to a delivery logic component 130. In one example, the notification 114 can be embodied in or can include a push notification. It should be appreciated that this disclosure is not so limited and any message according to a communication protocol can be sent to the delivery logic component 130.

The notification 114 can serve as a directive to generate a flight package for the content package that triggered or otherwise caused the notification 114. Flight packages, in accordance with this disclosure, can be or can include customized versions of respective content packages, where a customized version a content package includes the media asset of the content package and defined metadata that controls presentation (e.g., display) of the media asset at a semi-connected device or any other device intended for consumption of the content package. As such, it is noted that a flight package is compatible with all platforms, systems, and/or devices that can process a content package. In some aspects, in order to generate the flight package for a content package that triggers the notification 114, the delivery logic component 130 can include or otherwise can access (from a computer-readable storage device, for example) one or more rules 134 for generation of defined metadata that can control presentation of the media asset at a device intended for consumption of the media asset. A rule of the one or more rules 134 can be configurable and, in some aspects, can be specific to a publisher of the content package; the type of the content package; a type of a device intended for consumption of the media asset; a model of such a device; an operating system (OS) of such a device; a combination of the foregoing; or the like. Configuration of a rule of the rule(s) 134 can be implemented via a component (not shown) that can receive input information (e.g., data, metadata, and/or signaling) that defines the rule. Such a component can be integrated into the delivery logic component 130 or it can be external and functionally coupled to the delivery logic component 130. In some implementations, upon or after configuration, a rule can become static in that it can remain unchanged during the production of flight packages regardless of feedback information (such as performance of the flight package) that may be received in response to consumption of the flight package at a semi-connected device. In addition or in other implementations, the rule can be dynamically adjusted as such feedback information is received. In one example, the content package can be embodied in or can include an advertisement and the type of the content package can refer to the type of the advertisement, such as paid advertisement, in-house-advertisement, remnant advertisement, or the like. For a particular type of advertisement, different flight packages can be generated by adjusting a rule for the generation of the flight package.

Upon or after a rule for generation of a flight package has been configured, flight packages in accordance with aspects of this disclosure can be generated in a number of ways. In one example, in response to the notification 114, the delivery logic component 130 can send (e.g., push) the rule to a flight generation component 140. The flight generation component 140 can apply the rule and, in response, the flight generation component 140 can access (e.g., retrieve or otherwise load) the content package associated with the rule. In addition, the flight generation component 140 can apply the rule and, in response to the application of the rule, the flight generation component 140 can generate metadata defined by the rule. In some aspects, the metadata can control presentation (e.g., display) of the media asset of the content package at an intended device. In further response to the application of the rule, the flight generation component 140 can integrate the media asset and the metadata into a data structure indicative or otherwise representative of the flight package. It is noted that the application of rules to generate a flight package, and the ensuing generation of the flight package, are not feasible to be performed as a series of mental steps. More specifically, mental steps cannot integrate the metadata associated with the flight package and the digital information indicative of the media asset. In some scenarios, such automation can yield an increase in processing efficiency of about 10% to about 15% compared to laborious and error-prone manual generation of flight packages.

The flight generation component 140 can send the flight package and/or information (e.g., metadata) associated with the flight package to a repository 120. Such information can update (e.g., generate or modify) a mapping between content packages and flight packages. Such a mapping (not depicted) can be retained in one or more memory elements within the repository 120.

As shown in FIG. 1, the example operational environment 100 also can include a content delivery platform 150 that can utilize one or more networks 160 to send information to one or more devices 170. The network(s) 160 can include wireless network(s) and/or wireline network(s) having various coverage footprints, and the device(s) 170 can include at least one semi-connected device. More specifically, in some aspects, the content delivery platform 150 can access a content package from the content package(s) 122 and can send, via at least one of the network(s) 160, the content package to a subset of the semi-connected devices 170. The content package can be queued for delivery and can be sent to the subset of the device(s) 170 in response to the devices in the subset being connected to the at least one of the network(s) 160. The content package can be sent individually to a device in the subset of the device(s) 170 in response to the device being connected. In the alternative, the content package can be delivered collective to some or all of the devices in the subset being connected. Such a subset can be referred to as a device cohort. In some example scenarios, the device cohort can include a number or devices ranging from several hundred devices to a few thousand devices. Yet, the disclosure is not so limited and the device cohort can include any number of multiple semi-connected devices. As mentioned, metadata of the content package can determine that the content package is to be presented at each of the subset of devices during a period $\Delta t = t_f - t_i$, as shown in diagram 180. The period $\Delta t$ can span any number of days (e.g., one day, two days, three days, five days, 10 days, 15 days, 30 days, 90 days, or the like). In some implementations the duration of the period $\Delta t$ can be specific to the type of directed content associated with the content package. For instance, for directed content embodied in or including advertisement, the period $\Delta t$ can correspond to the duration of an advertisement campaign—e.g., 30 days for paid advertisement, seven days for a recommendation for a product or service, three days for remnant advertisement (also referred to as Type II advertisement).

Metadata included in a content package can determine the manner in which a device of the device(s) 170 presents a media asset of a content package during a period $\Delta t$. As described herein, in a scenario in which $\Delta t$ has an extended duration (e.g., 30 days, 60 days, or the like), such a presentation paradigm may be detrimental to performance of the media asset. The performance can be represented by a number of impressions of the media asset, a number of interactions with the media asset at the device, a combination thereof, or the like. Yet, in accordance with aspects of the present disclosure, the content delivery platform 150 can access, from the flight package(s) 124, a flight package associated with the content package and can send the flight package to the subset of the semi-connected device(s) 170 via at least one of the network(s) 160. As described herein, the flight package can include the media asset of the content package and, in some aspects, metadata included in the flight package can permit or otherwise facilitate presenting the media asset for a period less than $\Delta t$. It is noted that the disclosure is not so limited and, in some embodiments, the flight package can include a second media asset rather than the media asset. The second media asset can represent, for example, an alternative arrangement for the directed content associated with the flight package. The content delivery platform 150 can send flight packages in a number of ways. In one example, the content delivery platform 150 or a component device can apply or otherwise utilize a delivery rule to determine a time at which (or, in some embodiments, a time after which) a flight package is to be sent to at least one of the device(s) 170. The delivery rule (not depicted) can be retained in the repository 120. In some implementations, the media asset and the metadata of the flight package can be sent in conjunction to the at least one device. In other implementations, the media asset of the flight package can be sent in a first submission at a first time, and the metadata can be sent in a second submission at a second time. To that end, in one example, the delivery rule can indicate that media assets and metadata of respective flight packages are to be sent to a semi-connected device in a compartmentalized fashion. In such implementation, the semi-connected device can include logic (e.g., a software application or an instructions module) that, in response to execution, can assemble or otherwise configure a flight package by integrating a pertinent media asset and pertinent metadata into the flight package. In such implementations, for example, a batch of media assets (e.g., creative assets for advertisement) can be sent to the semi-connected device at certain time(s), and the metadata that can control presentation of one or more of the batch of media assets at the device can be sent to the semi-connected device at other times. Accordingly, in some aspects, the presentation of at least one media asset of the batch of media assets can be customized by updating metadata, without a re-submission of the at least one media asset to the semi-connected device.

In some embodiments, as illustrated in diagram 180, presentation of the flight package can include presentation of the media asset (labeled "content A") for a period equal to $\Delta t/3$. The content delivery platform 150 also can permit presentation of other media assets associated with respective other flight packages at the subset of the semi-connected device(s) 170 during the remaining interval $2\Delta t/3$, as further shown in diagram 180. Thus, in scenarios in which directed content is to be presented at the subset of the device(s) 170 for the duration of the period $\Delta t$, the operational environment 100 can permit delivery and presentation of different flight packages during the period $\Delta t$ instead of a single content package. The flight packages presented during the period $\Delta t$ have respective media assets. As an illustration, three flight packages can be delivered to the subset of the device(s) 170, where each of the three flight packages can be presented according to respective metadata during a period $\Delta t/3$.

It is noted that while a common period $\Delta t/3$ is illustrated in the diagram 180, the disclosure is not limited in that respect, and other combination of periods $\Delta t_1$, $\Delta t_2$, and $\Delta t_3$ satisfying $\Delta t_1 + \Delta t_2 + \Delta t_3 = \Delta t$ can be implemented. Similarly, the disclosure is not limited to delivery and presentation of three flight packages to the device(s) 170. In general, N flight packages can be delivered for presentation during respective periods $\Delta t_k$, with k=1, 2, . . . , N and N being a natural number, where $\Delta t_1 + \Delta t_2 + \ldots + \Delta t_N = \Delta t$.

Figure 2:
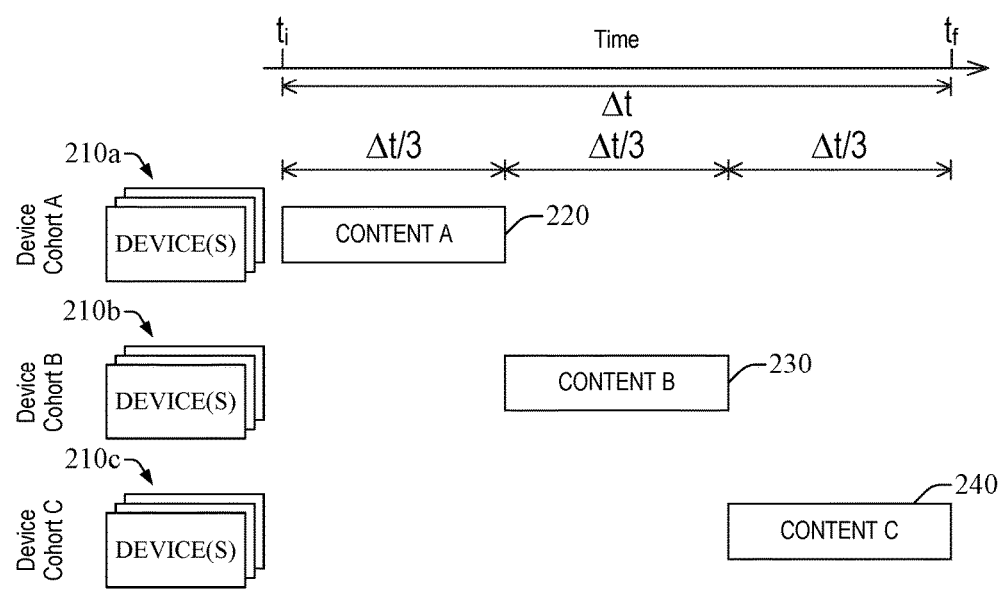
FIGS. 2-3 present examples of delivery of content in accordance with one or more embodiments of the disclosure.

Delivery and presentation of a variety of media assets at the semi-connected device(s) 170 can mitigate or avoid altogether issues related to presentation of defined content for extended periods (e.g., 30 days or 90 days). In some scenarios, as illustrated in FIG. 2, delivery and presentation of flight packages to semi-connected devices in accordance with aspects of this disclosure can permit extending the reach of directed content, such as advertisement or other customized content. More specifically, a flight package 220 including a media asset representative of first directed content (labeled as "Content A" in FIG. 2) can be delivered to a first cohort of semi-connected devices including devices 210a. For the sake of nomenclature, the first cohort of semi-connected devices may be referred to as "device cohort A," and it includes a number $N_a$ of devices. The flight package 220 can be delivered to the devices 210a for presentation during a period $\Delta t_a = \Delta t/3$, for example, where $\Delta t$ can correspond to an intended duration of presentation of directed content to semi-connected devices. Similarly, a flight package 230 including a second media asset representative of second directed content (labeled as "Content B") can be delivered to a second cohort of semi-connected devices including devices 210b. For the sake of nomenclature, the second cohort of semi-connected devices may be referred to as "device cohort B," and it includes a second number $N_b$ of devices. The number $N_b$ can be, in some instances, the same as $N_a$. In other instances, $N_b$ can be greater or less than $N_a$. The flight package 230 can be delivered to the devices 210b for presentation during a second period $\Delta t_b = \Delta t/3$, after the first period elapses. Further, a flight package 240 can be delivered to a third cohort of semi-connected devices including devices 210c. For the sake of nomenclature, the third cohort of semi-connected devices may be referred to as "device cohort C," and it includes a third number $N_c$ of devices. The number $N_c$ can be, in some instances, the same as $N_a$ or $N_b$. In other instances, $N_b$ can be greater than either $N_a$ or $N_b$, or both. In yet other instances, N, can be less than $N_a$ or $N_b$, or both. The flight package 240 can be delivered to devices 210c for presentation during a third period $\Delta t_c = \Delta t/3$, after the second period elapses. As such, during a period $\Delta t$, a variety of directed content (e.g., Content A, Content B, and Content C) can reach distinct cohorts of semi-connected devices. Therefore, in some aspects, such delivery of flight packages can increase the reach of the directed content when compared to conventional systems in which a single content package is delivered to a single cohort of semi-connected devices for presentation during the period $\Delta t$. It is noted that $\Delta t_a$, $\Delta t_b$, and $\Delta t_c$ are not limited to being equal to a common period $\Delta t/3$, as illustrated in FIG. 2. In general, other combination of periods $\Delta t_a$, $\Delta t_b$, and $\Delta t_c$ satisfying $\Delta t_a + \Delta t_b + \Delta t_c = \Delta t$ can be implemented.

Figure 3:
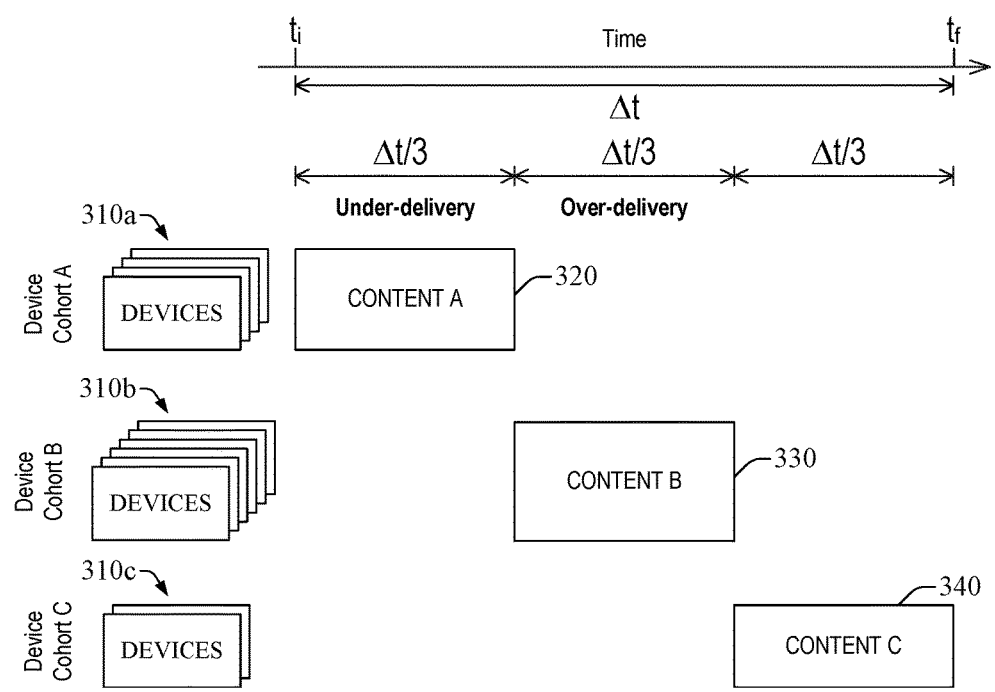

In other scenarios, as illustrated in FIG. 3, delivery and presentation of flight packages to semi-connected devices can permit flexible pacing for the presentation of directed content. Specifically, in some aspects, a first cohort of semi-connected devices, including devices 310a, can receive a flight package 320 for presentation at devices 310a during a period $\Delta t$. The flight package 320 can include a media asset representative of defined directed content (labeled as "Content A" in FIG. 3). The defined directed content can include, for example, an advertisement, an image, an audio segment, a video segment, or other types of digital media. For the sake of nomenclature, the first cohort of semi-connected devices may be referred to as "device cohort A," and it includes a second number $N_a$ of devices. In an example scenario, the number $N_a$ of devices 310a can be less than a target number of devices to be reached during the period $\Delta t$. Thus, the defined directed content can be referred to as being under delivered. The under delivery of the flight package 320, and associated defined directed content, can be compensated by delivering a flight package 330 to a second cohort of semi-connected devices including devices 310b, where the number $N_b$ of the devices 310b is greater than the number $N_a$ of devices 310a. The flight package 330 can include a second media asset representative of second defined directed content (labeled as "Content B" in FIG. 3). The second defined directed content can include, for example, another advertisement, another image, another audio segment, another video segment, or yet other types of digital media. The greater number of devices in the second cohort of semi-connected devices can increase the delivery of the second media asset, which in some scenarios can result in delivering such content to more than the target number of devices to be reached during the period $\Delta t$. Such delivery can be referred to as over-delivery and can be compensated by delivering a flight package 340 to a third cohort of semi-connected devices including devices 310c, where the number $N_c$ of devices 310c is less than the number $N_a$ of the devices 310a. The flight package 340 can include a third media asset representative of third defined directed content (labeled as "Content C" in FIG. 3). The third defined directed content can include, for example, yet another advertisement, yet another image, yet another audio segment, yet another video segment, or yet other types of digital media.

Besides increasing reach of directed content and providing flexibility in the pacing of the delivery of directed content, flight packages in accordance with aspects of the disclosure can permit presentation of specific directed content during a configurable interval, e.g., the period for presentation defined by metadata contained in the flight package. Thus, in some aspects, flight packages can permit changing the directed content presented at a device during an extended period $\Delta t$, without reliance on selective removal of the directed content from the repository 120 and/or without sending removal instructions. Absence of removal instructions is generally compatible with conventional semi-connected devices and, therefore, renders the flight packages backwards compatible. Further, configuration and generation of flight packages is decoupled from the generation of content packages at the content generator platform 110, which ensures flexibility with respect to different types of directed content since flight packages can be agnostic to the type of directed content. In addition, such a decoupling permits providing the improvements described herein, without affecting (e.g., slowing down) or otherwise reconfiguring conventional publication process(es) of content packages at the content generator platform 110. Therefore, the operational environment 100 and other operational environments described herein can improve delivery of directed content when compared to conventional systems for publication and delivery of directed content.

Figure 4A:
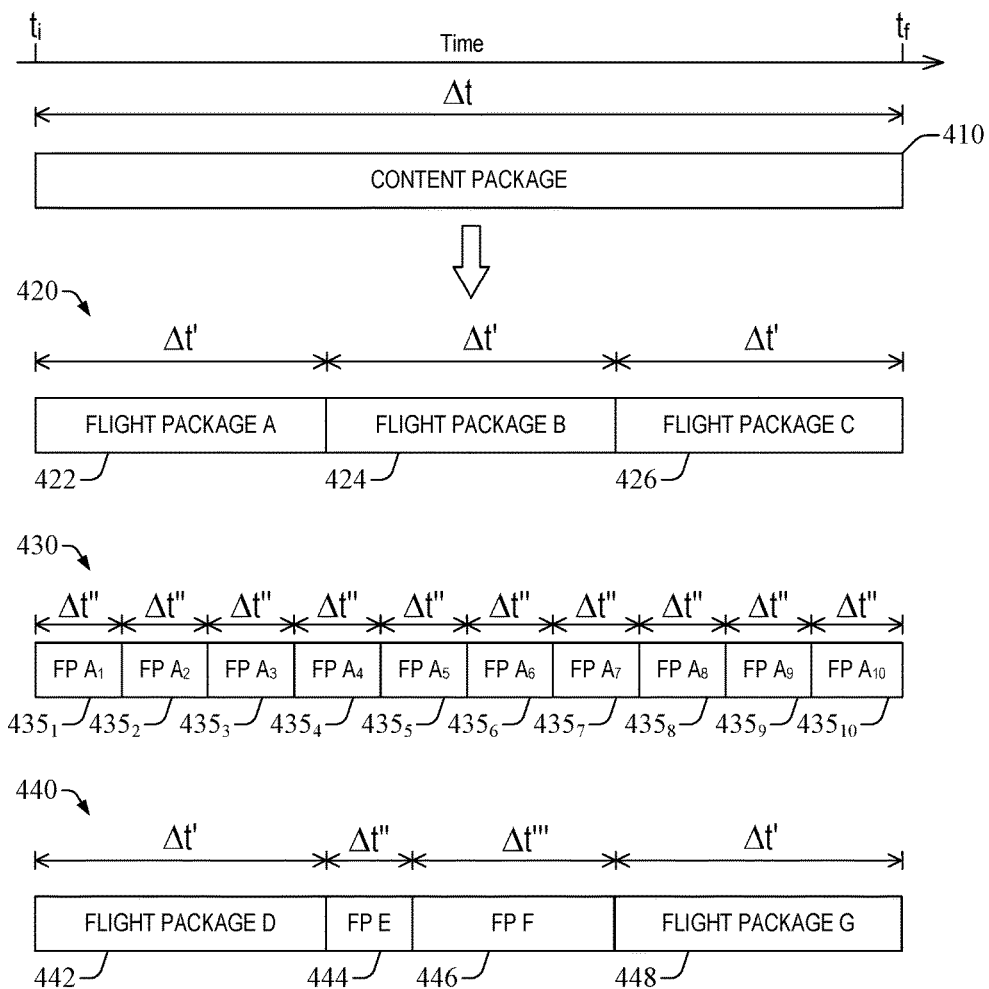
FIG. 4A presents an example of customized partitioning of content in accordance with one or more embodiments of the disclosure.

With further reference to FIG. 1, as discussed herein, the rules available for generation of a flight package can permit the customization of the manner in which directed content is presented at a device. Therefore, in some implementations, rather than delivering a content package, the content delivery platform 150, via a device thereof, for example, can send flight packages that can be presented at a semi-connected device during respective periods. In example scenarios in which the directed content to be delivered is advertisement, such periods can be customized according to the type of advertisement (or, in some instances, the type of advertising program). For instance, flight packages associated with paid advertisement can include metadata indicative or otherwise representative of a defined period (e.g., 10 days). In addition, other flight packages associated with recommendation advertisements can include metadata indicative or otherwise representative of another defined period (e.g., seven days). Further, yet other flight packages associated with remnant advertisement can include metadata indicative or otherwise representative of yet another defined period (e.g., three days). Flight packages other than those associated with advertisement also can be configured (e.g., generated, updated, or the like) to be presented during a custom period. FIG. 4A illustrates such customization of the periods during which a flight package can be presented at a semi-connected device (e.g., one of the device(s) 170) in accordance with aspects of this disclosure. As discussed herein, a content package 410 generated for delivery to a semi-connected device and presentation at the semi-connected device for a period $\Delta t$ can be partitioned into flight packages, such as flight package (FP) A 422 shown in diagram 420. The flight package A 422 can be presented at the semi-connected device for a period $\Delta t'$ shorter than $\Delta t$. For example, $\Delta t'=10$ days and $\Delta t=30$ days. A flight package B 424 and a flight package 426 also can be presented at the semi-connected device subsequent to the period Δt', during respective periods Δt'. In other scenarios, as shown in diagram 430, the content package 410 can be partitioned into more than three flight packages. As mentioned, some types of directed content may be configured, upon generation, for example, to be presented during short periods (e.g., three days or seven days). Accordingly, flight packages can be generated, by the flight generation component 140, to be presented at the semi-connected device during a period Δt" shorter than Δt'. As illustrated in diagram 430, the flight packages $435_1$-$435_{10}$ can be generated and delivered to the semi-connected device. The flight packages $435_1$-$435_{10}$ can be delivered in sequence and each of the flight packages $435_1$-$435_{10}$ can be configured for presentation at the semi-connected device during the period Δt". In addition or in other scenarios, flight packages can be generated and delivered for presentation at the semi-connected device during respective periods that may not be equal. As an illustration, different types of directed content may be delivered to the semi-connective, each of the different types being configured for presentation at the semi-connected device during a defined period. As illustrated in diagram 440, a flight package D 442 can be generated and delivered for presentation at the semi-connected device during the period Δt' (e.g., 10 days). A flight package E 444 can be generated and delivered for presentation at the semi-connected device during the period Δt". As discussed herein, the flight package E 444 can be delivered before, upon, or after the flight package D 442 expires and a communication session is established between the semi-connected device and a network server device or other type of network device that permits communication between the content delivery platform 150 and the semi-connected device. In addition, a flight package 446 can be generated and delivered to the semi-connected device for presentation during a period Δt''', where Δt'<Δt'''<Δt". Further, a flight package G 448 can be generated and delivered to the semi-connected device for presentation during the period Δt'.

Figure 4B:
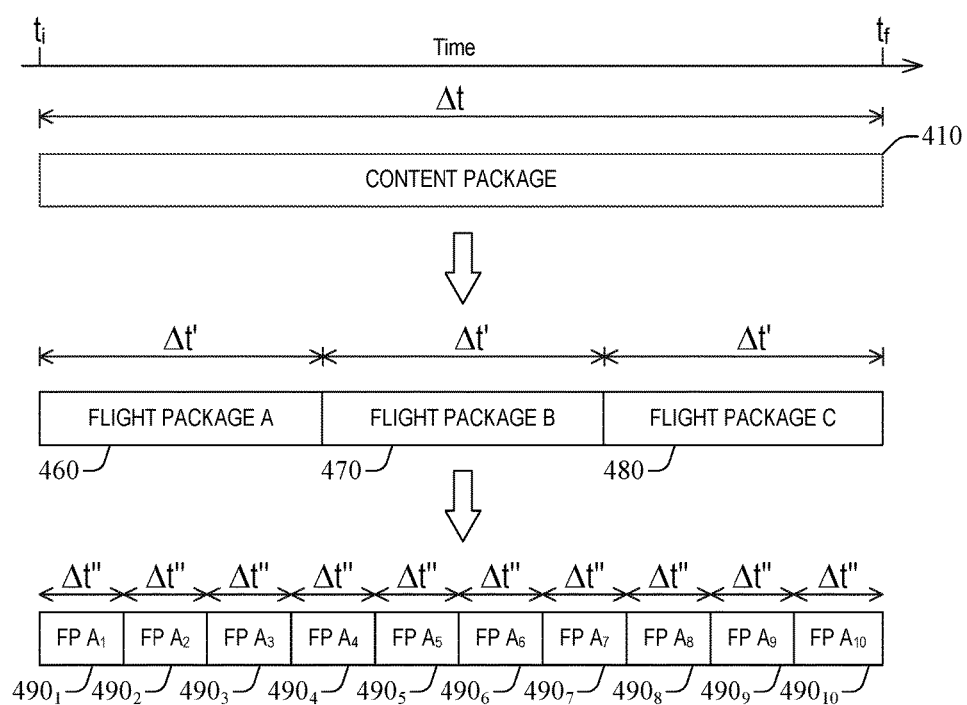
FIG. 4B presents an example of multi-tier partitioning of content in accordance with one or more embodiments of the disclosure.

In addition or in other embodiments, some of the rules available for generation of a flight package can permit generating a child flight package from a parent flight package. Therefore, in some implementations, flight packages of a defined duration can be partitioned into flight packages of shorter duration. FIG. 4B illustrates formation of child flight packages from parent flights packages in accordance with aspects of this disclosure. As discussed herein, a content package 410 generated for delivery to a semi-connected device and presentation at the semi-connected device for a period Δt can be partitioned into a flight package, such as flight package (FP) A 460. As shown, the flight package 460can be presented at the semi-connected device for a period Δt' shorter than Δt. A flight package 470 and a flight package 480 can be presented at the semi-connected device during respective periods Δt'. Each of the flight packages 460, 470, and 480 can be partitioned to form other flight packages for presentation at the semi-connected device during shorter durations. As illustrated, rather than delivering flight packages 460, 470, and 480 to the semi-connected device, flight packages $490_1$-$490_{10}$ can be delivered to the semi-connected device. Each of the flight packages $490_1$-$490_{10}$ is configured for presentation at the semi-connected device during a period Δt". The flight packages $490_1$-$490_{10}$ can be referred to as child packages and can permit greater utilization of certain types of content (e.g., remnant advertisement) and/or can permit further mitigation of issues associated with presentation of defined content during extended periods.

Figure 5:
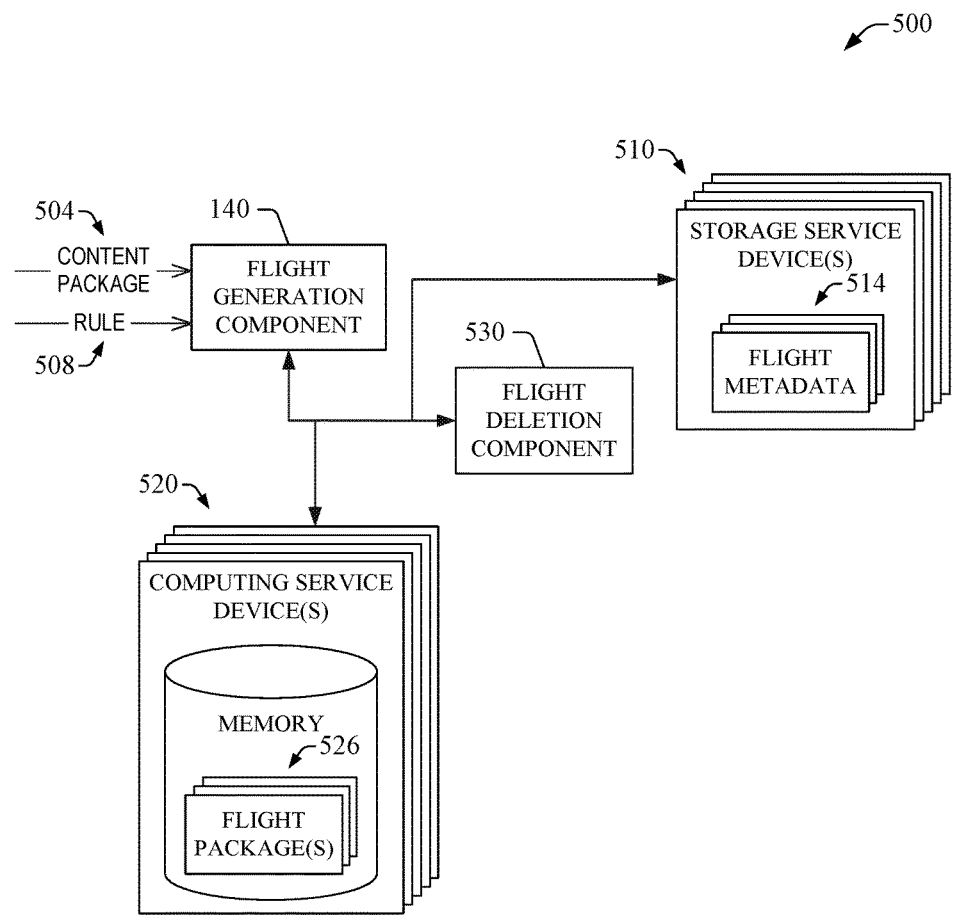
FIG. 5 presents an example of another operational environment for management of content in accordance with one or more embodiments of the disclosure.

FIG. 5 illustrates another example of an operational environment for generation and management of content in accordance with one or more embodiments of the disclosure. As illustrated, the operational environment includes the flight generation component 140, which can receive a content package 504 and a rule 508. The content package 504 includes a media asset and metadata that directs presentation of the media asset at an intended semi-connected device. For example, the metadata can include first metadata indicative of an initial time to display the media asset, second metadata indicative of a final time to display the media asset, third metadata indicative of a frequency cap for the display or otherwise presentation of the media asset, and/or fourth metadata indicative of a priority to display or otherwise present the media asset. In some aspects, a device that receives such metadata can group media assets, including the media asset after it is received at the device, according to respective priorities of the media assets. In some scenarios, such priorities can form tiers of priority. Upon or after the media assets are grouped, the device can present media asset(s) having a defined priority (e.g., pertaining to a defined priority tier) until reaching respective frequency cap(s). Subsequently, the device can present other media asset(s) having a lower defined priority (e.g., pertaining to a lower priority tier) until reaching other respective frequency cap(s). The device can traverse available media assets having respective priorities until the caps in higher priorities are reset or respective final times are spanned. The flight generation component 140 can apply the rule and, in response, can access the media asset of the content package, and can generate flight metadata that can alter the manner in which the media asset can be presented at the intended semi-connected device. Accordingly, in some aspects, the second metadata can include fifth metadata indicative of a second initial time to display the media asset, sixth metadata indicative of a second final time to display the media asset, seventh metadata indicative of a second frequency cap for the display of the media asset, and/or eighth metadata indicative of a second priority to display the media asset. In some embodiments, the flight generation component 140 can retain the flight metadata in one or more memory elements 514 (collectively referred to as flight metadata 514) within one or more storage service device(s) 510. In addition or in other embodiments, the flight generation component 140 can generate other flight metadata indicative of an association between the content package 504 and the flight package created according to the rule 508. Such flight metadata can be retained in a list or another type of data structure within the flight metadata 514. The association can permit, for example, a device of the content delivery platform 150 to determine a flight package to be delivered to the intended semi-connected device.

The flight generation component 140 can integrate a media asset of the content package 504 and flight metadata that customizes presentation of the media asset at a semi-connected device, resulting in a flight package. The flight generation component 140 can retain the flight package in one or more memory devices 526 (collectively referred to as memory 526) within one or more computing service device(s) 520. Retaining flight packages within the computing service device(s) 520 as opposed to the storage service device(s) 510 can permit operating on one or more of the flight packages via a service provided by the computing service device(s) 520.

In certain scenarios, flight packages associated with a content package or a few content packages can proliferate depending on the rule 508 and/or other of the rule(s) 134 in the operational environment shown in FIG. 1. More specifically, the rule(s) 134 can contemplate various pacing condition, reach conditions, number of device cohorts, and/or feedback received from semi-connected devices. Therefore, after a period for presentation of defined directed content elapses (e.g., after an advertisement campaign expires, a trial service expires, and the like), a flight deletion component 530 can remove some or all of the flight packages generated for the defined directed content. More specifically, in one embodiment, the flight deletion component 530 can access flight metadata from the flight metadata 514 and can determined that such a period elapsed. In response, the flight deletion component 530 can delete, in the flight package(s) 526, some or all of the flight packages associated with the defined directed content.

Figure 6:
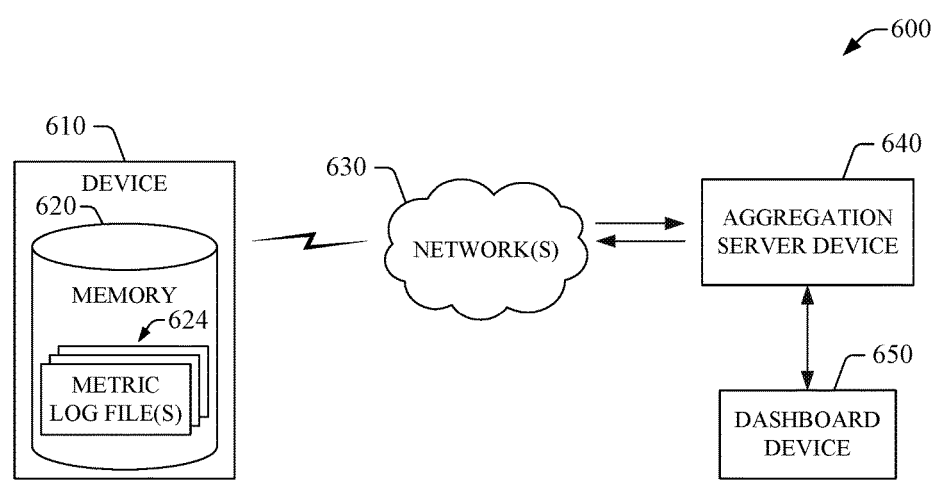
FIG. 6 presents an example of an operational environment for feedback associated with directed content in accordance with one or more embodiments of the disclosure.

FIG. 6 illustrates an example of an operational environment for feedback associated with directed content in accordance with or more embodiments of the disclosure. In the operational environment, a semi-connected device 610 can present (e.g., display) media assets associated with respective flight packages according to metadata of the respective flight packages. The semi-connected device 610 can determine metrics indicative of interaction with the directed content at the semi-connected device 610. The interaction can represent performance of the directed content and can include, for example, impressions of a media asset representative of the directed content; selections of the media asset; combinations thereof, or the like. Such metrics can be specific to a flight package and, thus, can correspond to a defined period $\Delta\tau$ during which the flight package is available for presentation at the semi-connected device 610. Accordingly, in some aspects, at least a portion of the metrics can permit or otherwise facilitate comparative testing (such as AB testing) associated with variants of the directed content. More specifically, during presentation of a first flight, the semi-connected device 610 can determine first metrics indicative of interaction with a first media asset representative of the directed content. In addition, during presentation of a second flight for the same directed content, the semi-connected device 610 can determine second metrics indicative of other interaction with a second media asset representative of the directed content. The first metrics and the second metrics can permit or otherwise facilitate the evaluation of the performance of the first media asset and the second media asset. Further or in other embodiments, the semi-connected device 610 can determine connection states of the device 610, and can determine connectivity metrics indicative of number of attempts to connect to a communication network of one or more networks 630; number of communication sessions established at the device 610; span of an interval of usage of the semi-connected device 610 during a communication session; a combination of the foregoing; or the like. In some embodiments, the semi-connected device 610 can retain at least a portion of such metrics in one or more metric log files 624 or another type of memory elements within one or more memory devices 620 (collectively referred to as memory 620). In some instances, in response to connection (e.g., upon or after connection) to a network of the network(s) 630, the semi-connected device 610 can send information indicative of at least a portion of the metric log file(s) 624.

As illustrated in FIG. 6, an aggregation server device 640 can receive from the semi-connected device 610 at least a portion of the information associated with the metric log file(s) 624. The aggregation server device also can receive information associated with metric log files of other semi-connected devices included in a device cohort as described herein. In some aspects, the aggregation server device 640 can process the received information in order to determine performance metrics for the directed content (e.g., an advertisement) based at least on the received metrics for flight packages associated with the directed content. The aggregation server device 640 can utilize, for example, at least a portion of the performance metrics in order to determine or otherwise identify segments of semi-connected devices having similar performance, e.g., having performance metrics that satisfy one or more defined similarity criteria. The aggregation server device 640 also can utilize the performance metrics to implement comparative testing for media assets associated with defined directed content (e.g., an advertisement). For instance, in a scenario in which the directed content is embodied in or includes an advertisement, the aggregation server device 640 can access a first performance metric (e.g., selection rate) associated with a first flight package having a first creative asset presented at a semi-connected device during a first period $\Delta t_1$. The aggregation server device 640 also can access a second performance metric (e.g., second selection rate) associated with a second flight package having a second creative asset presented at the semi-connected device during a second period $\Delta t_2$. The aggregation server device 640 can compare the first performance metric and the second performance metric and, based on an outcome of the comparison, the aggregation server device 640 can identify the better performing creative asset. In addition or in other embodiments, the aggregation server device 640 can send or otherwise can make available at least a portion of the performance metrics to another device (e.g., a memory device or a server device) or a component therein (e.g., the delivery logic component 130). A dashboard device 650 can present performance metrics pertaining to the directed content.

Figure 7:
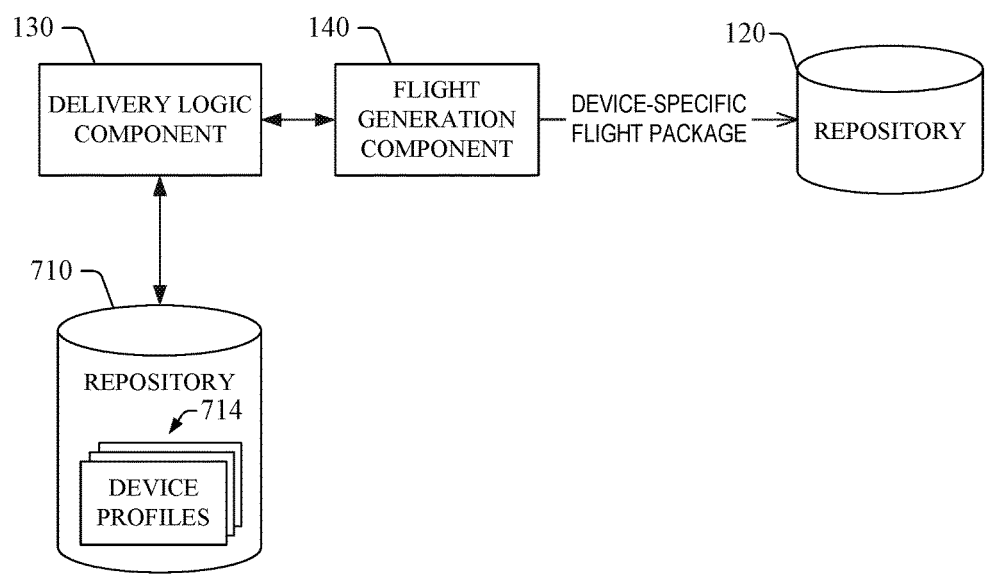
FIG. 7 presents an example of an operational environment for customization of directed content in accordance with one or more embodiments of the disclosure.

FIG. 7 presents an example of an operational environment for customization of directed content in accordance with one or more embodiments of the disclosure. As described herein, in some embodiments, performance metrics associated with flight packages can be generated based at least on feedback information received from semi-connected devices (e.g. devices 310a, devices 310b, or devices 310c). For instance, the aggregation server device 640 described herein can generate device profiles for respective semi-connected devices. In some implementations, each (or, in some embodiments, at least one) of the device profiles can include information indicative of a connectivity profile of a respective semi-connected device. In addition or in other implementations, each (or, in some embodiments, at least one) of the device profiles can include other information indicative of interactivity profile of a respective semi-connected device. In some aspects, the connectivity profile can convey that a semi-connected device has a defined pattern of connectivity (e.g., frequent connector device, infrequent connector device, or the like). In addition or in other aspects, the connectivity profile can convey usage of a semi-connected device while the device is connected to a communication network. Further, in some aspects, the connectivity profile can include information indicative or otherwise representative of a number of impressions of directed content at a semi-connected device and/or metrics determined using at least the number of impressions. For instance, such metrics can include total number of impressions during a defined period (e.g., $\Delta t$, $2\Delta t$, or the like); average number of impression during another defined period.

Device profiles can be retained in one or more memory elements 714 (collectively referred to as device profiles 714) within one or more memory devices 710 (collectively referred to as repository 710). In some embodiments, the delivery logic component 130 can access information indicative of a device profile for a semi-connected device (e.g., one of the semi-connected device(s) 170), and can generate, using at least a portion of such information, a rule for generating a device-specific flight package. The rule can be applicable to or otherwise associated with, for example, a cohort of semi-connected devices, a subset of the cohort of semi-connected devices, or a particular semi-connected device. In one example, the rule can contemplate that frequent-connector devices can be assigned short flights (e.g., 3-day flights) with a high frequency cap (e.g., one media asset per day). In another example, the rule can contemplate that infrequent-connector devices can be assigned long flights (e.g., 10-day flights) with low frequency caps (e.g., one media asset per week). The delivery logic component 130 can send (e.g., push) the rule to the flight generation component 140, which can generate a device-specific flight package in accordance with aspects described herein. As such, in an example scenario in which the rule is applicable to a particular semi-connected device, the device-specific flight package can be customized to the particular semi-connected device and the media asset associated with such a flight package.

Figure 8:
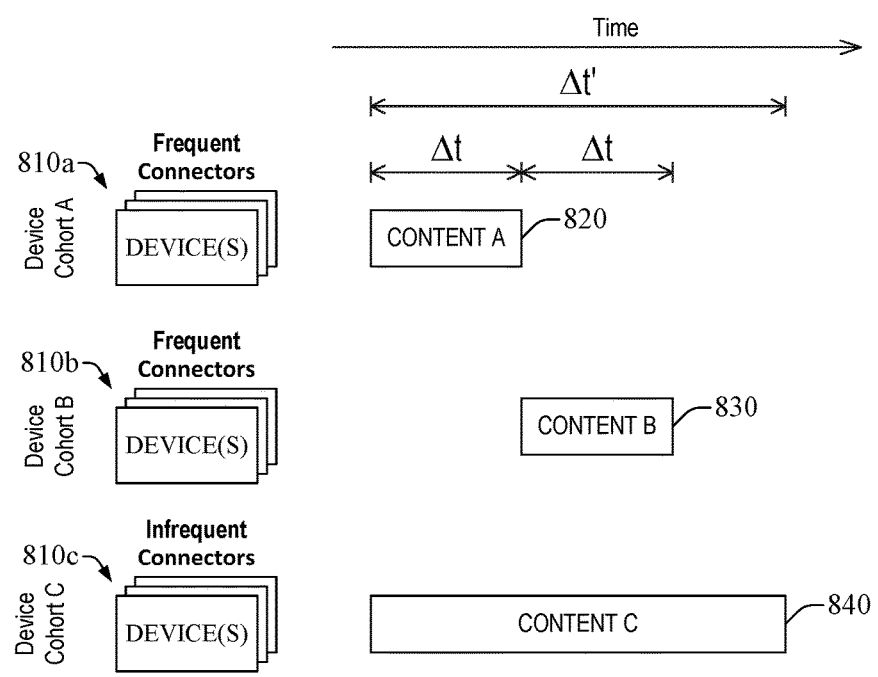
FIG. 8 presents another example of delivery of directed content in accordance with one or more embodiments of the disclosure.

As an illustration, FIG. 8 presents customized distribution of directed content for three example device cohorts. As illustrated, a first cohort of devices that are determined to be frequent connectors can receive a first flight package 820. The first cohort of devices includes devices 810a that can receive the flight package 820 for presentation during a period Δt. The period Δt can be determined based on the frequent-connector characteristic of the devices 810a. Similarly, a second cohort of semi-connected devices that are determined to be frequent connectors can receive a second flight package 830 during a second period Δt. The second cohort of semi-connected devices can include devices 810b. In one aspect, the period Δt is the same for the devices 810a and the devices 810b in view that such devices are characterized as frequent connectors. In addition, as further illustrated, a third cohort of semi-connected devices that are determined to be infrequent connectors can receive a third flight package 840 for presentation during a third period Δt'. During such period, devices 810c included in the third cohort of semi-connected devices can present the third flight package during the third period Δt'. In one aspect, the third period Δt' is greater than Δt in view that a device of the devices 810c is connected to a communication network less frequently than another device of the devices 810a or devices 810b. Accordingly, content (directed content or otherwise) can be provided to the devices 810c less frequently than to the devices 810b and devices 810a.

Figure 9:
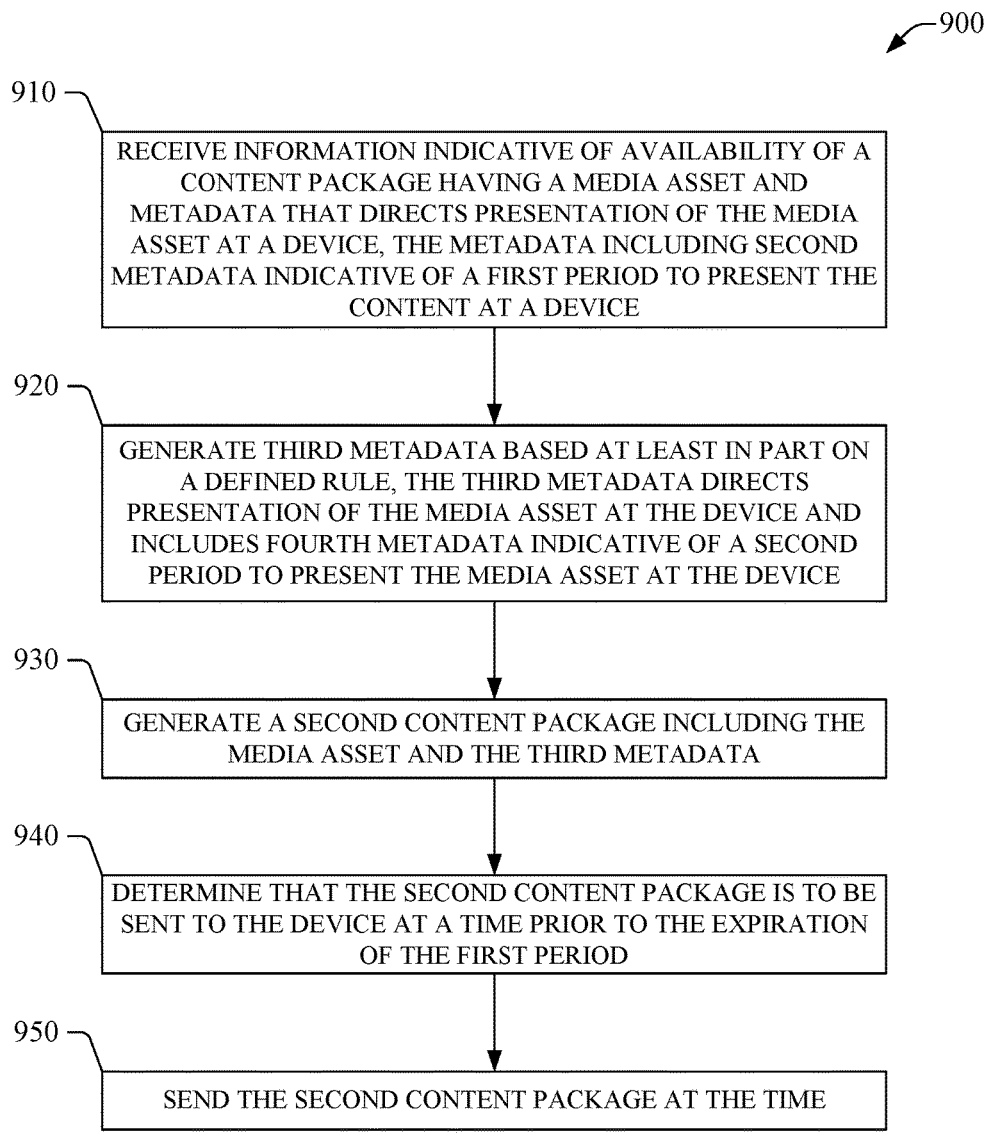
FIGS. 9-10 present examples of methods in accordance with one or more embodiments of the disclosure.
Figure 10:
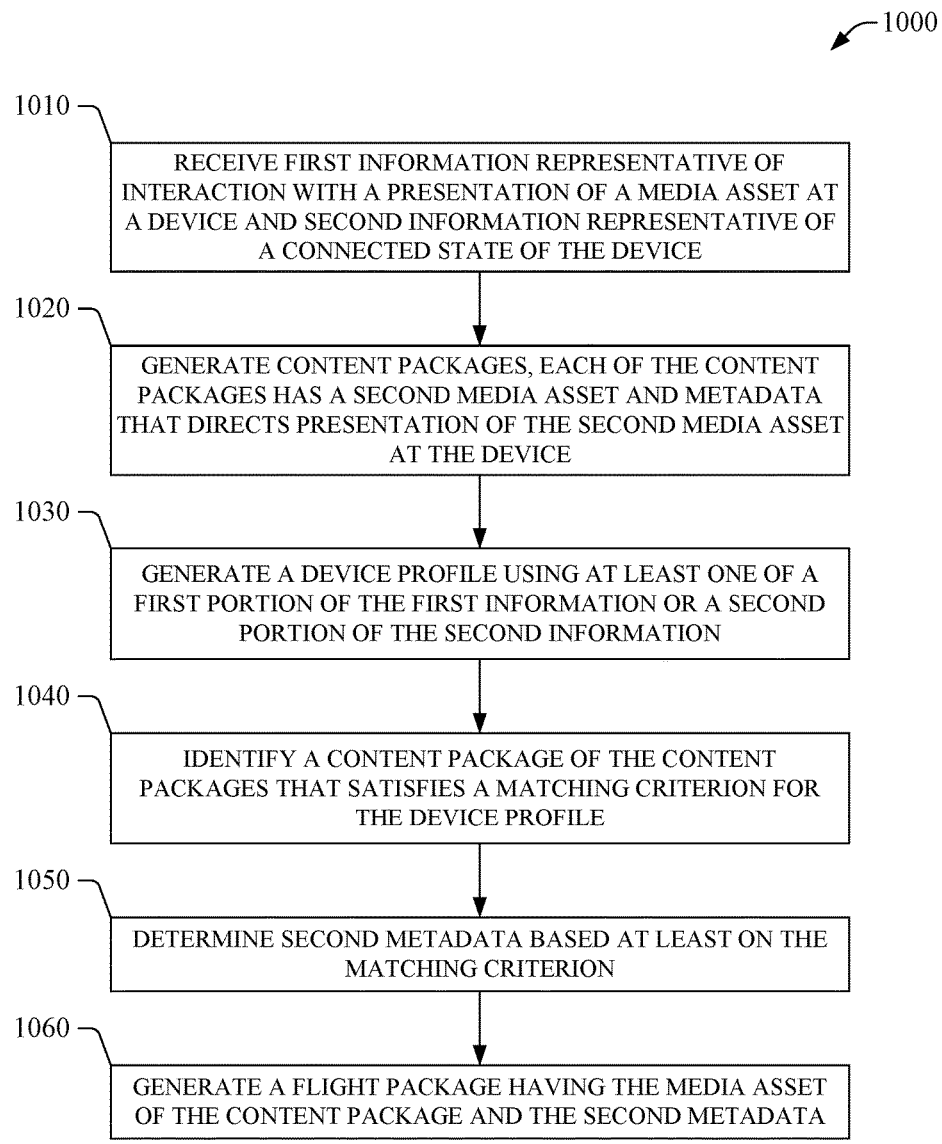

In view of the aspects of the disclosure described herein, example methods that can be implemented in accordance with the disclosure can be more readily appreciated with reference to the flowcharts in FIGS. 9-10. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action (s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 9 illustrates a flowchart of an example method 900 for delivery of directed content according to one or more embodiments of the disclosure. As described herein, the directed content can be embodied in or can include any type of digital media, such as advertisement; music; still images; motion pictures, animations, or other type of video segments; podcasts; and the like. Accordingly, the media assets referred to in the example method 900 can include digital media, such as animations, video segments (e.g., short-form videos), music, songs, and/or other pieces of digital content. In some embodiments, a computing system that has at least one processor and/or is functionally coupled to at least one processor can implement (e.g., compile, execute, compile and execute, etc.) one or more blocks of the example method 900. In some scenarios, one or more blocks of the example method 900 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 900 being implemented by a distributed or non-distributed computing system, the at least one processor can be functionally coupled to at least one memory device or other types of computer-readable non-transitory storage media.

At block 910, the computing system that implements the example method 900 can receive information indicative of availability of a content package having a media asset and metadata that can direct presentation of the media asset at a device. Such information can be embodied in or can include a message according to a defined communication protocol. For instance, as described herein, the message can include the notification 114, such as a push notification or another type of notification. In some aspects, the metadata includes second metadata indicative or otherwise representative of a first period to present the content at the device. The device can be embodied in or can include a semi-connected device, such as one of the device(s) 170.

At block 920, the computing system can generate third metadata based at least in part on a defined rule, which can be embodied in or can include a business rule or another type of rule in accordance with aspects of this disclosure. The defined rule can be embodied in or can include at least one of the rule(s) 134. In some embodiments, the computing system can include the flight generation component 140, which can generate the third metadata in accordance with aspects described herein. In some aspects, the third metadata can direct presentation of the media asset at the device and can include fourth metadata indicative or otherwise representative of a second period to present the second media asset at the device. It is noted that in some embodiments, instead of directing the presentation of the media asset, the third metadata can direct the presentation of a second media asset that can be associated with the content package. In some aspects, the second media asset can represent an alternative to the media asset while conveying the same or similar directed content as the media asset. For instance, the second media asset can embody or can include an alternative creative asset for an advertisement associated with the content package. At block 930, the computing system can generate a second content package including the media asset and the third metadata. In some implementations, rather than including the media asset, the second content package can include the second media asset mentioned above. In at least one of the embodiments in which the computing system includes the flight generation component 140, the second content package can be generated by the flight generation component 140 in accordance with aspects described herein. In some embodiments, the example method 900 can include updating, by the computing system, mapping information indicative of a mapping between the second content package and the content package. In some aspects, updating the mapping information comprises retaining identifying information for the second content package in a data structure (e.g., a list, a table (relational or a non-relational), other types of arrays, or the like) within a service storage device (e.g., at least one storage service device(s) 510). In addition or in other embodiments, the example method 900 can include retaining the second content package in a storage device within a computing service device (e.g., at least one of the computing service device(s) 520.

At block 940, the computing system can determine that the second content package is to be sent to the device at a time prior to the expiration of the first period. In some embodiments, as described herein, a sub-system of the computing system or a component thereof can access a delivery rule and can apply the delivery rule (e.g., execute the rule) in order to determine the time at which (or, in some embodiments, after which) the second content package is to be sent to the device. In one implementation, the sub-system of the computing system can be embodied in the content delivery system 150 or one or more components thereof, and the delivery rule can be accessed from the repository 120. At block 950, the computing system can send the second content package at the time (or, in some embodiments, at a defined interval after the time). In some aspects, the second content package can be sent to the device for presentation of the second media asset during the second period, where the second period is shorter than the first period. In at least one of the embodiments in which the computing system includes the content delivery system 150, the second content package can be sent to the device by the content delivery system 150, via at least one of the network(s) 160, for example.

While not illustrated, in some embodiments, the example method 900 can include determining, by the computing system, that the first period elapsed. In some implementations, the content delivery platform 150 or a component thereof can monitor a timer indicative of the time elapsed since an initial time for presentation of content package and can determine that first period has elapsed in response to the timer being equal to or exceeding the first period. Upon or after the first period has elapsed, the computing system can delete identifying information associated with the second content package in data structure retaining such information, and also can delete the second content package in a storage device that retains information indicative or otherwise representative of a flight package.

FIG. 10 illustrates a flowchart of an example method 1000 for customization of flight packages according to one or more embodiments of the disclosure. The media assets referred to in the example method 1000 can include digital media, such as animations, video segments (e.g., short-form videos), music, songs, and/or other pieces of digital content. In some embodiments, a computing system that has at least one processor and/or is functionally coupled to at least one processor can implement (e.g., compile, execute, compile and execute, etc.) one or more blocks of the example method 1000. In some scenarios, one or more blocks of the example method 1000 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 1000 being implemented by a distributed or non-distributed computing system, the at least one processor can be functionally coupled to at least one memory device or other types of computer-readable non-transitory storage media.

At block 1010, the computing system that implements the example method 1000 can receive first information representative of interaction with a presentation of a media asset (e.g., an impression on an advertisement or display of digital media) at a device and second information representative of a connected stated of the device. As described herein, in some embodiments, the device can be a semi-connected device. In addition or in other embodiments, a component of the computing system, such as the aggregation server device 640 can receive the first information and/or the second information. At block 1020, the computing system can generate content packages, where each of the content packages has a second media asset and metadata that directs presentation of the second media asset at the device. To at least that end, as described herein, the metadata can include first metadata indicative or otherwise representative of an initial time for presentation of the media asset at the device and a final time for presentation at the device. The metadata also can include second metadata indicative or otherwise representative of a priority for presentation of the media asset at the device. In addition, the metadata can include third metadata indicative or otherwise representative of a frequency cap for presentation of the media asset at the device. In some embodiments, the flight generation component 140 can generate the content packages in accordance with aspects described herein.

At block 1030, the computing system can generate a device profile using at least one of a first portion of the first information or a second portion of the second information. In some embodiments, the component of the computing system that receives the first information and second information can generate the device profile. Specifically, in such embodiments, the aggregation server device 640 can generate the device profile. In other embodiments, a different component of the computing system can generate the device profile. In some aspects, as described, the device profile can include an impression profile, a usage profile, and/or a connectivity profile. The impression profile can include information indicative or otherwise representative of a number of presentations of the media asset at the device. The impression profile can be generated, for example, using the first portion of the first information. The usage profile can include information indicative or otherwise representative of time intervals that the device is utilized to consume content (e.g., an e-book or other digital content). The connectivity profile can include information indicative of a number of instances in which the device established a communication session with a network server within the computing system and/or other network devices (e.g., devices that constitute at least one of the network(s) 160) that can permit the exchange of information (data, metadata, and/or signaling) between the device and a remote network device.

At block 1040, the computing system can identify a content package of the content packages that satisfies a matching criterion for the device profile. In some implementations, the matching criterion can include a threshold frequency of connection to a remote network server within the computing system. In addition or in other implementations, the matching criterion can include a threshold amount of usage of the device over a defined period (e.g., three days, a week, two weeks, one month, or the like). For instance, matching criterion can correspond to 10 hours of use over one week. Further or in yet other implementations, the matching criterion can include a threshold amount of impression over the defined period or another defined period. At block 1050, the computing system can determine second metadata based at least on the matching criterion. In some aspects, the matching criterion can include a defined frequency of connection to a communication network server, and the second metadata can be selected using at least the defined frequency. More specifically, the semi-connected devices having a frequency of connection that is less than the defined frequency of connection, the period for presentation of flight package(s) can be longer that another period of presentation of other flight package(s) at another semi-connected device having a frequency of connection that is greater than the defined frequency of connection.

At block 1060, the computing system can generate a flight package having the media asset of the content package identified at block 1040 and the second metadata. In some embodiments, the flight generation component 140 can generate the flight package in accordance with aspects described herein.

While not illustrated, in some embodiments, the example method 1000 can include operations that can further leverage or otherwise utilize at least some of the information received at block 1010. More specifically, in such embodiments, the computing system that implements the example method 1000 can compare the first information received at block 1010 to third information representative of interaction with presentation of a third media asset at the device resulting in a comparison outcome. In addition, the computing system can determine, using at least the comparison outcome, that the third media asset causes greater interaction at the device than the media asset. Further, the computing system can generate a third content package having the third media asset and the second metadata determined at block 1050, for example.

Figure 11:
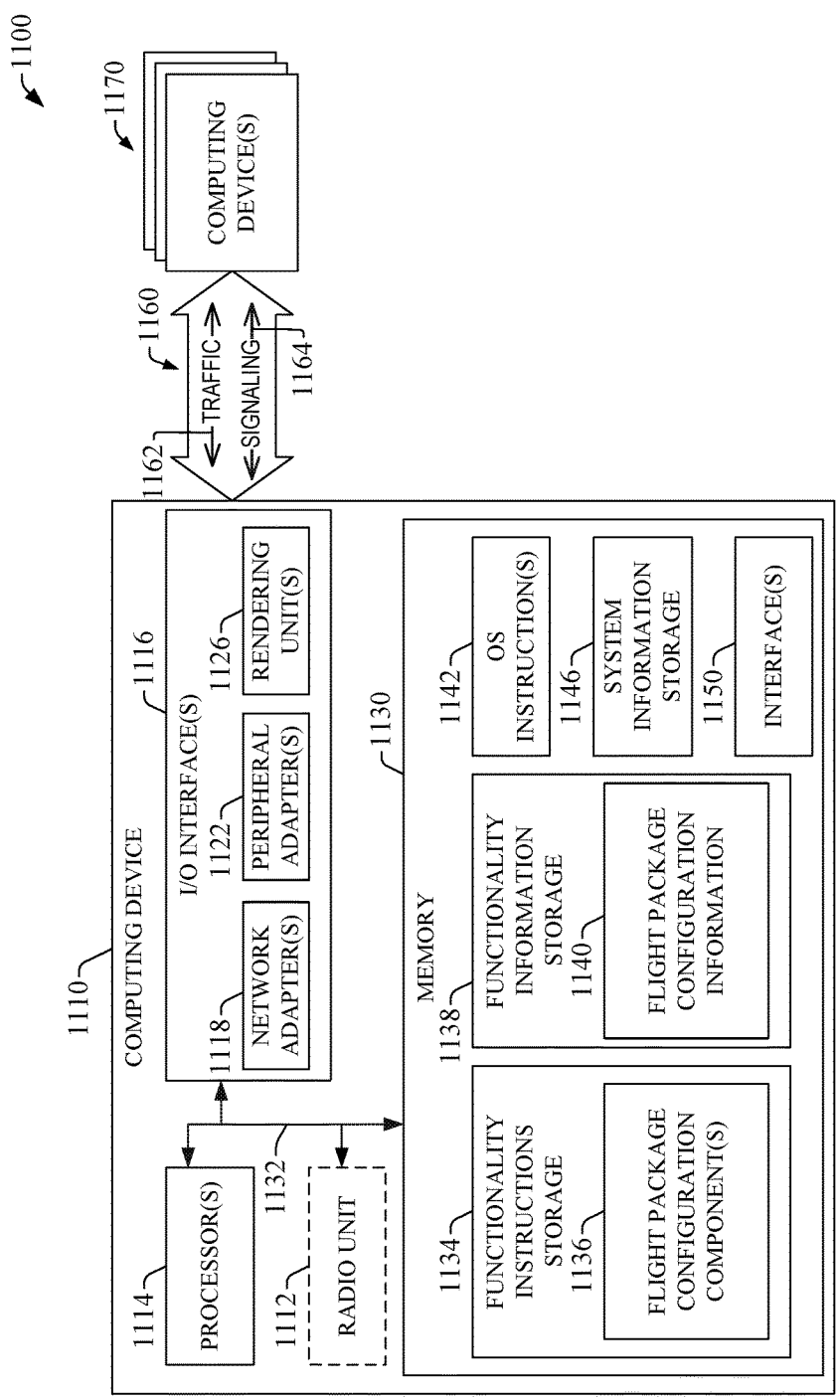
FIG. 11 presents an example of a computational environment for delivery and presentation of directed content in accordance with one or more embodiments of the disclosure.

FIG. 11 illustrates a block diagram of an example computational environment 1100 for delivery and/or presentation of directed content in accordance with one or more aspects of the disclosure. The example computational environment 1100 is merely illustrative and is not intended to suggest or otherwise convey any limitation as to the scope of use or functionality of the computational environment's architecture. In addition, the illustrative computational environment depicted in FIG. 11 should not be interpreted as having any dependency or requirement relating to any one or combination of components illustrated in the example operational environments of the disclosure. The example computational environment 1100 or portions thereof can embody or can include, for example, one or more of the operational environment 100, the operation environment 500, or the operational environment 600. For example, one or more of the computing devices, and elements thereof, in the example computational environment 1100 can embody or can constitute devices (or, in some embodiments, components or other functional elements) of the operational environment 100, the operational environment 500, the operational environment 600, or a combination thereof.

The computational environment 1100 represents an example implementation of the various aspects or features of the disclosure in which the processing or execution of operations described in connection with the delivery of directed content in semi-connected devices disclosed herein can be performed in response to execution of one or more software components at the computing device 1110. It should be appreciated that the one or more software components can render the computing device 1110, or any other computing device that contains such components, a particular machine for directed content delivery in semi-connected devices, in accordance with aspects described herein, among other functional purposes. A software component can be embodied in or can comprise one or more computer-accessible instructions (e.g., computer-readable and/or computer-executable instructions). In one scenario, at least a portion of the computer-accessible instructions can embody and/or can be executed to perform at least a part of one or more of the example methods described herein, such as the example method illustrated in FIG. 9 and/or the example method illustrated in FIG. 10. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1110 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1110 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the directed content delivery in semi-connected devices described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 1110 can comprise one or more processors 1114, one or more input/output (I/O) interfaces 1116, a memory 1130, and a bus architecture 1132 (also termed bus 1132) that functionally couples various functional elements of the computing device 1110. In certain embodiments, the computing device 1110 can include, optionally, a radio unit 1112. The radio unit 1112 can include one or more antennas and a communication processing unit that can permit wireless communication between the computing device 1110 and another device, such as one of the computing device(s) 1170. The bus 1132 can include at least one of a system bus, a memory bus, an address bus, or a message bus, and can permit exchange of information (data, metadata, and/or signaling) between the processor(s) 1114, the I/O interface(s) 1116, and/or the memory 1130, or respective functional elements therein. In certain scenarios, the bus 1132 in conjunction with one or more internal programming interfaces 1150 (also referred to as interface(s) 1150) can permit such exchange of information. In scenarios in which processor(s) 1114 include multiple processors, the computing device 1110 can utilize parallel computing.

The I/O interface(s) 1116 can permit communication of information between the computing device and an external device, such as another computing device (e.g., a network element or an end-user device). Such communication can include direct communication or indirect communication, such as exchange of information between the computing device 1110 and the external device via a network or elements thereof. As illustrated, the I/O interface(s) 1116 can comprise one or more of network adapter(s) 1118, peripheral adapter(s) 1122, and rendering unit(s) 1126. Such adapter(s) can permit or facilitate connectivity between the external device and one or more of the processor(s) 1114 or the memory 1130. For example, the peripheral adapter(s) 1122 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 1118 can functionally couple the computing device 1110 to one or more computing devices 1170 via one or more traffic and signaling links 1160 that can permit or facilitate exchange of traffic 1162 and signaling 1164 between the computing device 1110 and the one or more computing devices 1170. Such network coupling provided at least in part by the at least one of the network adapter(s) 1118 can be implemented in a wired environment, a wireless environment, or both. The information that is communicated by the at least one of the network adapter(s) 1118 can result from the implementation of one or more operations of a method in accordance with aspects of this disclosure. Such output can be any form of visual representation, including, but not limited to, textual, graphical, animation, audio, tactile, and the like. In certain scenarios, each (or, in some embodiments, at least one) of the computing device(s) 1170 can have the same architecture as (or, in some embodiments, a similar architecture to) the computing device 1110. In addition or in the alternative, the rendering unit(s) 1126 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 1110, or can permit conveying or revealing the operational conditions of the computing device 1110.

In one aspect, the bus 1132 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 1132, and all buses described herein can be implemented over a wired or wireless network connection and each of the subsystems, including the processor(s) 1114, the memory 1130 and memory elements therein, and the I/O interface(s) 1116 can be contained within one or more remote computing devices 1170 at physically separate locations, connected through buses of this form, in effect implementing a fully distributed system. In certain embodiments, such a distributed system can implement the functionality described herein in a client-host or client-server configuration in which the flight package configuration component(s) 1136 or the flight package configuration information 1140, or both, can be distributed between the computing device 1110 and at least one of the computing device(s) 1170, and the computing device 1110 and at least one of the computing device(s) 1170 can execute such components and/or leverage such information in order to provide or otherwise facilitate the functionalities described herein in connection with delivery or distribution of directed content to semi-connected devices. In such embodiments, for example, a combination of the computing device 1110 and at least one of the computing device(s) 1170 can embody or can constitute respective devices (or, in some implementations, components or other functional elements) of the operational environment 100, the operational environment 500, the operational environment 600, or a combination of the foregoing environments. As such, in some example implementations, a computing device of the computing device(s) 1170 can embody or can include a semi-connected device as described herein.

The computing device 1110 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1110, and can comprise, for example, both volatile and non-volatile media, and removable and/or non-removable media. In one aspect, the memory 1130 can comprise computer-readable media in the form of volatile memory, such as random access memory (RAM), and/or non-volatile memory, such as read-only memory (ROM).

The memory 1130 can comprise functionality instructions storage 1134 and functionality information storage 1138. The functionality instructions storage 1134 can comprise computer-accessible instructions that, in response to execution (by at least one of the processor(s) 1114), can implement one or more of the functionalities of the disclosure. The computer-accessible instructions can embody or can comprise one or more software components illustrated as flight package configuration component(s) 1136. In one scenario, execution of at least one component of the flight package configuration component(s) 1136 can implement one or more of the methods described herein, such as example method 900 and/or example method 1000. For instance, such execution can direct or otherwise cause a processor (e.g., one of the processor(s) 1114) that executes the at least one component to carry out a disclosed example method. It should be appreciated that, in one aspect, a processor of the processor(s) 1114 that executes at least one of the flight package configuration component(s) 1136 can retrieve information from or retain information in one or more memory elements 1140 in the functionality information storage 1138 in order to operate in accordance with the functionality programmed or otherwise configured by the flight package configuration component(s) 1136. The one or more memory elements 1140 may be referred to as flight package configuration information 1140. Such information can include at least one of code instructions, information structures, or the like. For instance, at least a portion of such information structures can be indicative of a mappings between a content package and flight packages; rules for configuration or generation of a flight package (such as rule(s) 134); device profiles (e.g., at least one of device profiles 714); performance metrics associated with flight packages or, in some embodiments, content packages; connectivity metrics; and/or, in some embodiments, other performance metrics (e.g., one or more metric log file(s) 624) generated and/or retained in a semi-connected device.

In certain embodiments, one or more of the flight package configuration component(s) 1136 can embody or can constitute at least one of the delivery logic component 130, the flight generation component 140, and/or the flight deletion component 530. In other embodiments, one or more of the flight package configuration component(s) 1136 in combination with at least one of the processor(s) 1114 can embody or can constitute at least one of the delivery logic component 130, the flight generation component 140, and/or the flight deletion component 530, wherein such combination(s) can provide the functionality of such components in accordance with aspects of this disclosure.

At least one of the one or more interfaces 1150 (e.g., application programming interface(s)) can permit or facilitate communication of information between two or more components within the functionality instructions storage 1134. The information that is communicated by the at least one interface can result from implementation of one or more operations in a method of the disclosure. In certain embodiments, one or more of the functionality instructions storage 1134 and the functionality information storage 1138 can be embodied in or can comprise removable/non-removable, and/or volatile/non-volatile computer storage media.

At least a portion of at least one of the flight package configuration component(s) 1136 or flight package configuration information 1140 can program or otherwise configure one or more of the processors 1114 to operate at least in accordance with the functionality described herein. One or more of the processor(s) 1114 can execute at least one of the flight package configuration component(s) 1136 and leverage at least a portion of the information in the functionality information storage 1138 in order to provide or otherwise facilitate the delivery of directed content to semi-connected devices in accordance with one or more aspects described herein.

It should be appreciated that, in certain scenarios, the functionality instruction(s) storage 1134 can embody or can comprise a computer-readable non-transitory storage medium having computer-accessible instructions that, in response to execution, cause at least one processor (e.g., one or more of the processor(s) 1114) to perform a group of operations comprising the operations or blocks described in connection with the disclosed methods.

In addition, the memory 1130 can comprise computer-accessible instructions and information (e.g., data, metadata, and/or programming code instructions) that permit or facilitate the operation and/or administration (e.g., upgrades, software installation, any other configuration, or the like) of the computing device 1110. Accordingly, as illustrated, the memory 1130 can comprise a memory element 1142 (labeled operating system (OS) instruction(s) 1142) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 1110 can dictate a suitable OS. The memory 1130 also comprises a system information storage 1146 having data, metadata, and/or programming code that permits or facilitates the operation and/or administration of the computing device 1110. Elements of the OS instruction(s) 1142 and the system information storage 1146 can be accessible or can be operated on by at least one of the processor(s) 1114.

It should be recognized that while the functionality instructions storage 1134 and other executable program components, such as the OS instruction(s) 1142, are illustrated herein as discrete blocks, such software components can reside at various times in different memory components of the computing device 1110, and can be executed by at least one of the processor(s) 1114. In certain scenarios, an implementation of the flight package configuration component(s) 1136 can be retained on or transmitted across some form of computer-readable media.

The computing device 1110 and/or one of the computing device(s) 1170 can include a power supply (not shown), which can power up components or functional elements within such devices. The power supply can be a rechargeable power supply, e.g., a rechargeable battery, and it can include one or more transformers to achieve a power level suitable for the operation of the computing device 1110 and/or one of the computing device(s) 1170, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1118) to connect operationally to the conventional power grid. In another aspect, the power supply can include an energy conversion component, such as a solar panel, to provide additional or alternative power resources or autonomy for the computing device 1110 and/or one of the computing device(s) 1170.

The computing device 1110 can operate in a networked environment by utilizing connections to one or more remote computing devices 1170. As an illustration, a remote computing device can be a personal computer, a portable computer, a server, a router, a network computer, a peer device or other common network node, and so on. As described herein, connections (physical and/or logical) between the computing device 1110 and a computing device of the one or more remote computing devices 1170 can be made via one or more traffic and signaling links 1160, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote computing devices (computing device(s) 1170) that are functionally coupled (e.g., communicatively linked or otherwise coupled) through a network having traffic and signaling links and related network elements. In a distributed computing environment, in one aspect, one or more software components (such as program modules) can be located in both a local computing device 1110 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques delivery of directed content and presentation of the directed content at a device intended for consumption of such content. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A system, comprising:
    at least one memory device having computer-executable instructions; and
    at least one processor coupled to the at least one memory and configured, by the computer-executable instructions, to:
        receive a notification indicative of availability of a first directed content package from a content publisher device, the first directed content package having digital media and first metadata that directs display of the digital media at a device, the first metadata including a first initial time to display the digital media at the device and a first final time to display the digital media at the device;
        apply, based at least in part on the notification, a first rule to determine second metadata to direct presentation of the digital media at the device, the second metadata including a second initial time to display the digital media at the device and a second final time to display the digital media at the device, wherein a first difference between the first final time and the first initial time is less than a second difference between the second final time and the second initial time;
        access the digital media based at least in part on the application of the first rule;
        generate a second directed content package based at least on the application of the first rule, wherein the second directed content package includes the digital media and the second metadata;
        apply a second rule to determine that the second directed content package is to be sent to the device at a time prior to the first final time; and
        send the second directed content package to the device at the time.

2. The system of claim 1, wherein the at least one processor is further configured to:
    determine that the device is configured to receive, after a connection between the device and a communication network server of the system is established, the second directed content package; and
    receive connectivity information indicative of the connection between the device and the communication network server of the system.

3. The system of claim 2, wherein the at least one processor is further configured to receive information indicative of performance of the second directed content package, and wherein the performance comprises at least one of a number of impressions of the digital media or a number of interactions with the digital media displayed at the device.

4. The system of claim 1, wherein the at least one processor is further configured to:
    generate a record indicative of an association between the second directed content package and the first directed content package;
    update a table within a service storage device with the record, wherein the table represents a mapping between the first directed content package and the second directed content package, and wherein the second rule includes the mapping;
    retain identifying information for the second directed content package in the table; and
    retain the second directed content package in a storage device within a computing service device.

5. The system of claim 4, wherein the at least one processor is further configured to:
- determine that a period corresponding to the first difference elapsed; and
- delete the second directed content package in the storage device.

6. A method, comprising:
- receiving, by a computing system comprising at least one processor coupled to at least one memory device, information indicative of availability of a first content package having a media asset and first metadata that directs presentation of the media asset at a device, the first metadata being indicative of a first period to present the media asset at the device;
- generating, by the computing system, second metadata based at least in part on a defined rule, wherein the second metadata directs presentation of the media asset at the device and is indicative of a second period to present the media asset at the device, and wherein the second period is shorter than the first period;
- generating, by the computing system, a second content package, wherein the second content package comprises the media asset and the second metadata; and
- determining, by the computing system, that the second content package is to be sent to the device at a time prior to the expiration of the first period.

7. The method of claim 6, further comprising:
- sending, by the computing system, the second content package to the device; and
- receiving, by the computing system, second information representative of interaction with a presentation of the media asset at the device, and third information representative of a connected state of the device.

8. The method of claim 7, further comprising:
- generating, by the computing system, content packages in response to the receiving the information, each of the content packages having a second media asset and third metadata that directs presentation of the second media asset at the device;
- generating, by the computing system, a device profile using at least one of a first portion of the second information or a second portion of the third information; and
- determining, by the computing system, a third content package of the content packages that satisfies a matching criterion for the device profile.

9. The method of claim 8, wherein the matching criterion comprises a defined frequency of connection to a communication network server, and wherein the determining the third content package comprises:
- determining, using at least the defined frequency, a third period for presentation of the second media asset; and
- selecting the third metadata using at least the defined frequency.

10. The method of claim 6, further comprising updating, by the computing system, second information indicative of a mapping between the second content package and the first content package, wherein the updating the second information comprises retaining identifying information for the second content package in a data structure within a service storage device.

11. The method of claim 10, further comprising retaining the second content package in a storage device within a computing service device.

12. The method of claim 11, further comprising:
- determining, by the computing system, that the period elapsed; and
- deleting, by the computing system, the identifying information in the data structure and the second content package in the storage device.

13. The method of claim 6, further comprising generating, by the computing system, a third content package having the media asset and third metadata that directs presentation of the media asset at the device, wherein the third metadata is indicative of a third period to present the media asset at the device, and wherein the third period is shorter than the second period.

14. The method of claim 7, further comprising:
- comparing, by the computing system, at least a portion of the second information to fourth information representative of interaction with a second presentation of a second media asset at the device, resulting in a comparison outcome, wherein the second media asset is associated with the first content package;
- determining, by the computing system, using at least the comparison outcome, that the second media asset causes greater interaction at the device than the media asset;
- generating, by the computing system, a third content package having the second media asset and third metadata that directs presentation of the second media asset at the device.

15. A system, comprising:
- at least one memory device having computer-executable instructions; and
- at least one processor coupled to the at least one memory and configured, by the computer-executable instructions, to:
  - receive information indicative of availability of a first content package having a media asset and first metadata that directs presentation of the media asset at a device, wherein the first metadata is indicative of a first period to present the media asset at the device;
  - generate second metadata based at least in part on a defined rule, wherein the second metadata directs presentation of the media asset at the device and is indicative of a second period to present the media asset at the device, and wherein the second period is shorter than the first period;
  - generate a second content package comprising the media asset and the second metadata; and
  - determine that the second content package is to be sent to the device at a time prior to the expiration of the first period.

16. The system of claim 15, wherein the at least one processor is further configured to:
- update second information indicative of a mapping between the second content package and the first content package;
- retain identifying information for the second content package in a list within a service storage device; and
- retain the second content package in a storage device within a computing service device.

17. The system of claim 16, wherein the at least one processor is further configured to:
- determine that the first period elapsed; and
- delete the identifying information in the service storage device and the second content package in the computing service device.

18. The system of claim 15, wherein the at least one processor is further configured to generate a third content package having the media asset and third metadata that directs presentation of the media asset at the device, wherein the third metadata is indicative of a third period to present the media asset at the device, and wherein the third period is shorter than the second period.

19. The system of claim 15, wherein the at least one processor is further configured to:
generate content packages, each of the content packages having the media asset and third metadata that directs presentation of the media asset at the device; and
determine a third content package of the content packages that satisfies a matching criterion for a device profile including device information indicative of connectivity of the device to a communication network server.

20. The system of claim 19, wherein the matching criterion comprises a defined frequency of connection to the communication network server, and wherein the at least one processor is further configured to retain the third content package within a computing service device.

\* \* \* \* \*